(12) United States Patent
Arcusin

(10) Patent No.: US 12,179,884 B2
(45) Date of Patent: Dec. 31, 2024

(54) FLOATING STRUCTURE FOR TRANSPORT FORMED BY A TRAIN ARRANGEMENT OF ROTARY BODIES OF REVOLUTION WHICH REDUCES THE DRAG OF SAME DURING SAILING

(71) Applicants: Carlos Eduardo Arcusin, Buenos Aires (AR); Alejandro Román Ganzabal Liberati, Buenos Aires (AR)

(72) Inventor: Carlos Eduardo Arcusin, Buenos Aires (AR)

(73) Assignee: Alejandro Roman Ganzabal Liberati, Buenos Aires (AR)

( * ) Notice: Subject to any disclaimer, the term of this patent is extended or adjusted under 35 U.S.C. 154(b) by 200 days.

(21) Appl. No.: 17/294,922

(22) PCT Filed: Nov. 19, 2018

(86) PCT No.: PCT/ES2018/070745
§ 371 (c)(1),
(2) Date: May 18, 2021

(87) PCT Pub. No.: WO2020/104707
PCT Pub. Date: May 28, 2020

(65) Prior Publication Data
US 2023/0219655 A1     Jul. 13, 2023

(51) Int. Cl.
*B63B 1/36*     (2006.01)
*B63B 1/40*     (2006.01)
*B63B 71/10*    (2020.01)

(52) U.S. Cl.
CPC .............. *B63B 1/36* (2013.01); *B63B 1/40* (2013.01); *B63B 71/10* (2020.01)

(58) Field of Classification Search
CPC ..... B63B 1/00; B63B 1/32; B63B 1/34; B63B 1/36; B63B 1/40; B63B 71/10; Y02T 70/10
(Continued)

(56) References Cited

U.S. PATENT DOCUMENTS

| 1,924,949 A | 8/1933 | Lombardini |
| 2,764,954 A | 10/1956 | Oeltgen |

(Continued)

FOREIGN PATENT DOCUMENTS

| EP | 0265382 A1 | 4/1988 |
| EP | 0926060 A3 | 3/2002 |

(Continued)

*Primary Examiner* — Daniel V Venne
(74) *Attorney, Agent, or Firm* — Volpe Koenig

(57) ABSTRACT

A floating structure for transport is presented, formed by a train arrangement of rotary bodies of revolution that reduces the drag of same during sailing, the train arrangement of rotary bodies being formed by a front body, intermediate bodies and a rear body that have rotation synchronized with the speed of travel of the structure, the intermediate bodies of revolution being connected together by longitudinal rotation shafts by connections secured to an upper platform, while the longitudinal rotation shafts of the front body and the rear body are connected to the rotation shafts of adjacent bodies by hinges, which are pivotably connected to an end of draft-adjustor, pivotably connected at their other ends to the upper platform, the longitudinal rotation shafts being disposed perpendicular to the structure's travel direction and associated with actuators. The rotary bodies are separated by a distance of approximately 5% or less of their diameter.

4 Claims, 3 Drawing Sheets

(58) Field of Classification Search
USPC .......................................................... 114/67 R
See application file for complete search history.

(56) References Cited

U.S. PATENT DOCUMENTS

| | | | |
|---|---|---|---|
| 3,875,885 | A | 4/1975 | Balquet et al. |
| 4,842,561 | A * | 6/1989 | Perrone .................... B63B 1/36 440/12.7 |
| 5,575,232 | A | 11/1996 | Kato et al. |
| 6,186,085 | B1 | 2/2001 | Kato et al. |
| 6,789,491 | B2 | 9/2004 | Takahashi et al. |
| 8,402,906 | B2 | 3/2013 | Takano et al. |
| 9,856,002 | B1 * | 1/2018 | Nadeau .................... B63B 35/34 |
| 2009/0266288 | A1 | 10/2009 | Lin |
| 2013/0203305 | A1 | 8/2013 | Lee |

FOREIGN PATENT DOCUMENTS

| | | |
|---|---|---|
| JP | S60139586 A | 7/1985 |
| JP | S62268793 A | 11/1987 |
| JP | 2001114185 A | 4/2001 |
| JP | 2009248611 A | 10/2009 |
| JP | 2010280342 A | 12/2010 |
| JP | 4959667 B2 | 6/2012 |
| WO | 9712768 A1 | 4/1997 |

* cited by examiner

FLOATING STRUCTURE FOR TRANSPORT FORMED BY A TRAIN ARRANGEMENT OF ROTARY BODIES OF REVOLUTION WHICH REDUCES THE DRAG OF SAME DURING SAILING

INVENTIVE FIELD

The present invention relates to a floating structure for transport formed by a tandem arrangement of rotating bodies of revolution, which reduces the resistance to advance thereof during its navigation.

By means of the present arrangement, the resistance to advance, constituted by the frictional or viscous resistance, and by the pressure resistance, also called residual resistance or resistance to wave formation, with respect to the known floating structures, is diminished, achieving either the decrease of the consumption, or the increase of the forward speed of said floating structure to a constant consumption. Furthermore, the possibility of loading inside said rotating bodies of revolution is foreseen.

BACKGROUND

Document US2009/0266288A1 discloses a method to reduce the frictional resistance between the body of a vessel and the water by emitting gases in the water, by supplying a plurality of gas outlets disposed at predetermined positions under water level in the front or bow of a ship's hull, pushing the hull upwards and thus decreasing the average density of water in surface contact with the hull.

Document JP2001-114185 discloses a method to reduce the pressure in the hull of a ship by very fine slits formed along the direction of seawater flow on the surface of the external plating of a ship, which was subjected to an anti-collision treatment, which reduces the resistance of the hull and prevents the adhesion of marine organisms.

Document JP4959667 discloses a device for reducing the frictional resistance in a ship's hull capable of emitting even air jets that generate bubbles from a plurality of holes formed in the lower part of the ship in which there is an air chamber.

Document EP0926060A3 discloses a method to reduce the frictional resistance of a ship with respect to water by generating bubbles by injecting gas into the water from selected locations that are spaced along the longitudinal direction by specific distances.

Document JP2009-248611 discloses a device for reducing the frictional resistance of a ship with respect to water capable of adequately changing the place of the production of bubbles and the number thereof according to the state of navigation of the ship or the state thereof, effectively reducing the frictional resistance by the precise blowing of bubbles even when turbulence occurs.

Document JP2010-280342 discloses a device for generating fine bubbles in a hull to reduce the frictional resistance of the fluid by forming thick layers of water that include fine bubbles on the submerged surface of the hull. It uses a pump capable of mixing a large amount of air in the suctioned water.

Document JP60-139586 discloses a bubble generator for reducing the frictional resistance, interconnected to a casing installed in the front hull of the lower plating of a ship.

Document JP62-268793 discloses a device for reducing the frictional resistance by the provision of air blowing means arranged in three layers respectively on both sides of the bow bulb where the dynamic pressure becomes negative.

Document U.S. Pat. No. 2,764,954 discloses an apparatus for the propulsion of ships by using an air jet stream interspersed with water to produce a reactive tensile force to propel the ship, substantially reducing the frictional resistance.

Document U.S. Pat. No. 5,575,232 discloses a method and a device for reducing the frictional resistance in a ship by generating micro bubbles.

Document U.S. Pat. No. 3,875,885 discloses a gas injection system for marine vehicles in which a primary gas injector creates an axial gas flow below the hull of the vessel, a primary aerator is provided below the hull of the vessel to generate an aerated flow of water and a second aerator, to further refine the aerated flow, which includes an inclined surface to give the main propulsive effect.

Document U.S. Pat. No. 6,789,491B2 discloses a method to reduce the frictional resistance of a ship between the external plating of the hull and the water by injecting air and thus generating microbubbles on the surface of said plating, below the waterline in the bow bulb.

Document U.S. Pat. No. 6,186,085B1 discloses a method to reduce the frictional resistance of a ship's hull by injecting microbubbles of predetermined diameter into the water from a position adjacent to the starting point of the water stream line and from the position where the static pressure is low, and the microbubbles are distributed in at least part of the circumferential area of the submerged portion of the hull, thus reducing the frictional resistance thereof while sailing.

Finally, document EP0265382A1 of the same Applicant, discloses flotation wheels that allow the displacement of aquatic vehicles or the like, the wheels having a spherical conformation with multiple blades that are fixed with free rotation to an axis connected to the hull of a ship, thus facilitating the movement thereof.

All the objects of the prior art discussed above have many disadvantages, among which we can mention that they are not efficient and require a lot of energy to reduce the frictional resistance of a floating structure while sailing. Even in many cases, the decrease in the frictional resistance is minimal considering the energy consumed for this purpose, not to mention the complexity of the devices to cause this effect.

SUMMARY

This has led the Applicant to develop a floating structure for transport formed by a tandem arrangement of rotating bodies of revolution that reduces the resistance to advance thereof during its navigation, said rotating bodies of revolution having a rotating speed synchronized with the forward speed of the assembly, and its longitudinal rotation axes being arranged perpendicular to the direction of advance of the floating structure. For the present application, said rotating bodies of revolution are preferably cylinders of identical geometry and dimensions. The longitudinal axes of rotation of said rotating cylinders are attached to support means such as forks, on which a platform is mounted, said platform being located above said cylinder tandem. Said cylinders are given a rotary impulse by driving means such as engines, for example, which are associated to said longitudinal axes of said rotating cylinders by transmission means such as belts, straps, chains or the like. In order to achieve an optimum effect in terms of reducing the resistance to advance during the advance of the floating structure, the Applicant has discovered that the draft of said cylinders must be of the order of 30% of its diameter. In order to achieve that said draft of the order of 30% of the diameter is maintained, the total load carried by the cylinders, both inside and outside thereof, must be evaluated.

DETAILED DESCRIPTION OF THE INVENTION

During the research stage, after numerous tests simulated by the CFD system with OpenFoam, the Applicant has verified, as previously mentioned, that the ideal draft of a cylinder is of the order of 30% of its diameter, since said cylinder rotating at a speed synchronized with the forward speed of the assembly compared with the same body without rotation, with said draft, can get a reduction in the resistance to advance of up to 50% of the overall resistance, and this reduction being only 5% when the draft is 50% of the diameter.

| Draft [% of diameter] | Forward Speed [m/sec] | Rotation Speed [m/sec] | Pressure Resistance [N] | Frictional Resistance [N] | Overall Resistance [N] | Rotation Torque [N · m] |
|---|---|---|---|---|---|---|
| 30 | 1.0 | 0.0 | 20.297 | 13.593 | 21.656 | 0.4741 |
| 30 | 1.0 | 1.0 | 12.621 | 0.1405 | 12.762 | -0.0513 |
| 50 | 1.0 | 0.0 | 46.123 | 0.6095 | 46.733 | 0.2600 |
| 50 | 1.0 | 1.0 | 44.486 | 0.1380 | 44.348 | -0.1970 |

Spacing Between Two or More Cylinders

Figure 3:
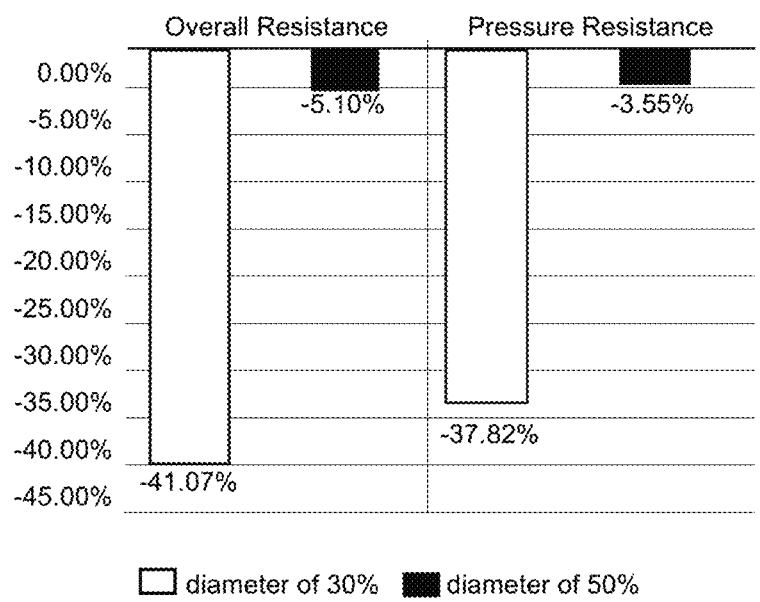
FIG. 3 is a graph showing the percentage reduction of resistance depending on the draft.

As previously mentioned, and with additional reference to FIG. 3, the Applicant has verified that the optimum distance between two or more cylinders is obtained when the bodies approach approximately 5% or less of their diameter causing a very significant hydrodynamic effect of interaction, which disappears when the rotating bodies move away.

Thrust of the Front Cylinder of an Cylinder Tandem Arrangement

With the optimum separation of around 5% or less and an optimum draft of the order of 30% of the diameter of the rotating cylinders, the Applicant has verified that the front cylinder in a cylinder tandem arrangement not only contributes to the decrease in the resistance to advance of a floating structure, but it also provides energy to the system, which is understood as thrust.

This phenomenon is achieved by the effect of an over-pressure in said rotating cylinder and the increase in the speed of the water flow across the submerged profile of the cylinder. Since the cylinder is only partially submerged and already in roto-translatory movement, the submerged section gets a pressure offered by a medium approximately 1000 times denser than the air in contact with the section outside the water. Said pressure difference brings a thrust coincident with the direction of advance of the assembly to the roto-translatory movement.

According to the results obtained from testing, a cylinder of 6 m diameter or length, with a draft of 2 m depth and 12 m length or beam, at the synchronized speed of 3.162 m/sec (both rotation and forward speed) provides a thrust equivalent to 73.14 H P to the system.

Figure 4:
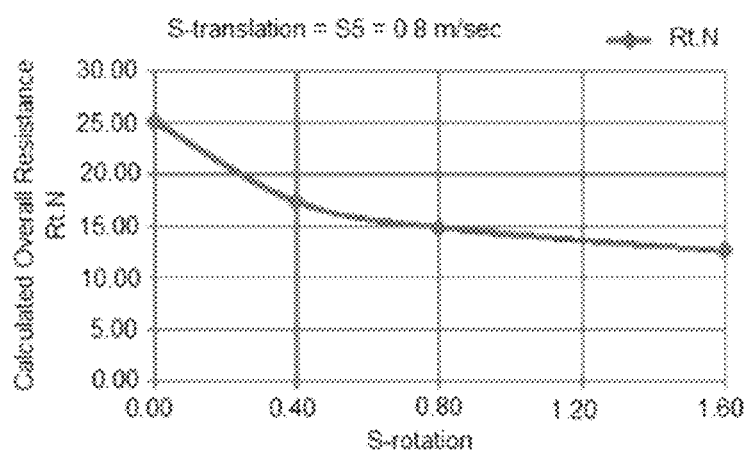
FIG. 4 is a graph showing variation of overall resistance calculated with the rotation speed.

Synchronized Rotation of Three Cylinders, and Over-Rotation from the Front Cylinder to the Rear Cylinder in a Cylinder Tandem Arrangement With reference to FIG. 4, the Applicant has evaluated different percentages of rotation speed in relation to the forward speed of the assembly, observing a continuous decrease in the resistance when generating an over-rotation in said cylinders, as can be seen in the figure below.

When analyzing an assembly of 3 rotating cylinders with synchronized rotation, the variation of the rotation speed or over-rotation was also discussed in an incremental way from the front cylinder to the rear cylinder, obtaining the following results:

a. Three cylinders, synchronized rotation at the speed of 1 m/sec, the reduction obtained was 43% of the overall resistance to advance of the assembly;

b. Three cylinders, synchronized front cylinder, synchronized intermediate cylinder and rear cylinder rotating at twice the synchronized speed, the reduction obtained was 52% of the overall resistance to advance of the assembly;

c. Three cylinders, synchronized front cylinder, intermediate cylinder rotating at 1.5 times the synchronized speed and rear cylinder rotating at twice the synchronized speed, the reduction obtained was 56% of the overall resistance to advance of the assembly.

| | Front Cylinder | | | | | | |
|---|---|---|---|---|---|---|---|
| Front-Intermediate-Rear | Pressure Resistance [N] | Frictional Resistance [N] | Overall Resistance [N] | Rotation Torque [N · m] | EP [W] | RP [W] | Total Power [W] |
| V00-V00-V00 | 42.00 | 1.29 | 43.29 | 0.44 | 43.3 | 0.0 | 43.3 |
| V10-V10-V10 | -29.23 | -0.10 | -29.33 | -0.21 | -29.3 | 0.7 | -28.7 |
| V10-V10-V20 | -29.90 | -0.09 | -29.98 | -0.21 | -30.0 | 0.7 | -29.3 |
| V10-V15-V20 | -29–55 | -0.08 | -29.63 | -0.21 | -29.6 | 0.7 | -29.0 |

Intermediate Cylinder

| Front-Intermediate-Rear | Pressure Resistance [N] | Frictional Resistance [N] | Overall Resistance [N] | Rotation Torque [N · m] | EP [W] | RP [W] | Total Power [W] |
|---|---|---|---|---|---|---|---|
| V00-V00-V00 | 13.04 | 0.90 | 13.94 | 0.22 | 13.9 | 0.0 | 13.9 |
| V10-V10-V10 | 17.22 | −0.59 | 16.63 | −0.40 | 16.6 | 1.3 | 17.9 |
| V10-V10-V20 | 13.05 | −0.60 | 12.45 | −0.42 | 12.4 | 1.3 | 13.8 |
| V10-V15-V20 | 6.28 | −1.37 | 4.91 | −1.60 | 4.9 | 7.5 | 12.5 |

Rear Cylinder

| Front-Intermediate-Rear | Pressure Resistance [N] | Frictional Resistance [N] | Overall Resistance [N] | Rotation Torque [N · m] | EP [W] | RP [W] | Total Power [W] |
|---|---|---|---|---|---|---|---|
| V00-V00-V00 | 29.04 | 1.36 | 30.39 | 0.40 | 30.4 | 0.0 | 30.4 |
| V10-V10-V10 | 62.91 | −0.48 | 62.43 | −0.32 | 62.4 | 1.0 | 63.4 |
| V10-V10-V20 | 60.32 | −1.39 | 58.94 | −3.02 | 58.9 | 19.0 | 77.9 |
| V10-V15-V20 | 64.38 | −1.18 | 63.20 | −2.93 | 63.2 | 18.4 | 81.6 |

V00=no rotation
V10=Synchronized R 5 Rotation Speed=1 m/sec
V15=1.5 times the Synchronized Rotation Speed
V20=twice the Synchronized Rotation Speed
TEP=Tow Effective Power=Overall Resistance×Forward Speed
RP=Rotation Power=Rotation Torque×Angular Rotation Speed

3-Cylinder Assembly

| Front-Intermediate-Rear | Pressure Resistance [N] | Frictional Resistance [N] | Overall Resistance [N] | Rotation Torque [N · m] | EP [W] | RP [W] | Total Power [W] |
|---|---|---|---|---|---|---|---|
| V00-V00-V00 | 84.07 | 3.54 | 87.61 | 1.06 | 87.61 | 0.00 | 87.61 |
| V10-V10-V10 | 50.90 | −1.17 | 49.73 | −0.93 | 49.73 | 2.95 | 52.68 |
| V10-V10-V20 | 43.47 | −2.07 | 41.41 | −3.65 | 41.41 | 20.96 | 62.37 |
| V10-V15-V20 | 41.11 | −2.63 | 38.49 | −4.74 | 38.49 | 26.58 | 65.06 |

Figure 5:
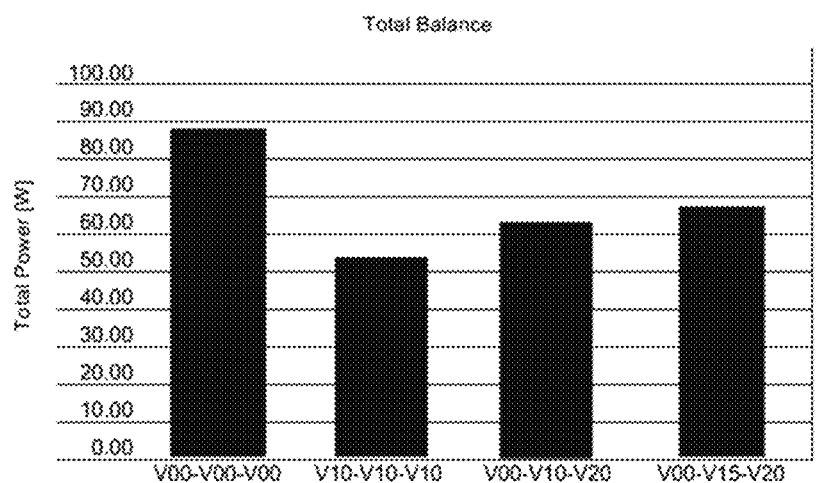
FIG. 5 is a graph showing the total balance vs. the total power.

V00 = no rotation
V10 = Synchronized Rotation Speed = 1 m/sec
V15 = 1.5 times the Synchronized Rotation Speed
V20 = twice t 5 he Synchronized Rotation Speed
TEP = Tow Effective Power = Overall Resistance × Forward Speed
RP = Rotation Power = Rotation Torque × Angular Rotation Speed As can be noted with additional reference to FIG. 5, the over-rotation has a significant impact in the overall resistance. Although from the point of view of the energy balance, the optimal choice is that of synchronized rotation at the same forward speed of the floating structure, from the point of view of the need to achieve an increase in speed thereof, the other options are very valid. "As can be noted.

Different configurations were tested:

a. All cylinders rotating synchronously;

b. Only the front cylinder rotating synchronously;

c. Only the rear cylinder rotating synchronously; and d. All cylinders without rotation.

It has been observed that the greatest decrease, and even the thrust in all cases, is always provided by the front cylinder.

However, when the rear cylinder was analyzed while rotating only, and even in the case of over-rotation, said rear cylinder brings a reduction of the overall resistance of the assembly of the order of 5%.

As expected, the benefit of the rotation is progressively related to the scale used. That is why each floating structure that applies this method of energy reduction in its bow and/or the stern, should test the best scale option for each configuration.

A further feature of the invention is that each of the rotating cylinders can carry load inside, and can also include inside a static and concentric cylinder of smaller diameter to transport said load, thus harnessing the volume and improving the cost per transported ton ratio.

The rotating cylinders do not have any type of wings or blades, their surface being as smooth as possible.

The effect of decreasing the resistance to advance is much greater than the resistance generated by the cylinders in the water, since the pressure resistance is modified, also called residual resistance or resistance to wave formation. The pressure resistance is the cause of about 90% of the overall resistance of a floating structure and increases exponentially depending on the speed.

Furthermore, fluvial and maritime transportation costs include both fuel consumption and all costs related to transport time, such as daily rental and crew hiring; that is why with this arrangement, either the reduction of consumption or the increase in the forward speed of the floating structure at a constant consumption is sought. This results in less polluting and more economic floating structures, or with shorter cycle times with their respective savings as long as logistics is concerned.

This generates a highly efficient ratio of energy consumed per ton of load transported and, in addition, a highly stable design.

Then, an object of the present invention is a floating structure for transport formed by a tandem arrangement of rotating bodies of revolution that decreases the resistance to advance thereof during its navigation, characterized in that said tandem arrangement of rotating bodies of revolution is formed by a front body of revolution, intermediate bodies of revolution and a rear body of revolution which have a rotation synchronized with the forward speed of said structure, said intermediate bodies of revolution being related to each other by their longitudinal rotation axes by attachment means fixed to an upper platform, and at the same time the longitudinal rotation axes of said front and rear bodies of revolution are associated to the rotation axes of the bodies of revolution adjacent to them by hinge means, said hinge means pivotally joined to one end of the draft control means, which are joined by the other end thereof pivotally to said upper platform, said longitudinal rotation axes arranged perpendicular to the direction of advance of said structure and associated to driving means; and said rotating bodies of revolution being spaced apart from each other by a distance of approximately 5% or less of their maximum diameters.

Figure 1:
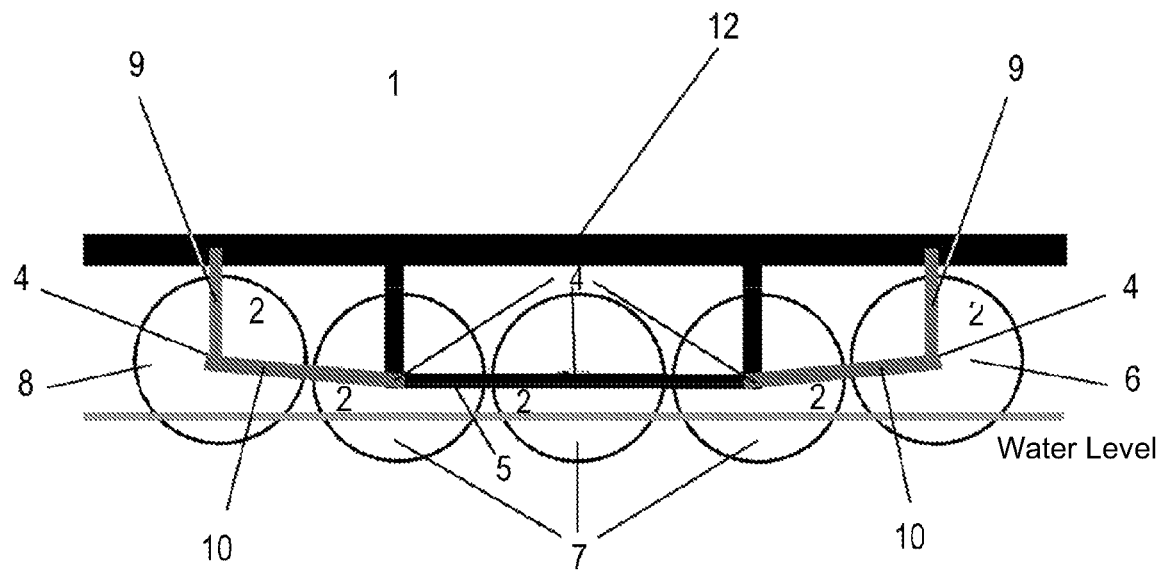
FIG. 1 illustrates a side view of a tandem of rotating cylinders with a rotation synchronized with the forward speed of a floating structure, submerged by 30% of their diameter.

FIG. 1 illustrates a floating structure 1 for transport formed by a tandem arrangement of rotating cylinders 2 formed by a front cylinder 6, intermediate cylinders 7 and a rear cylinder 8, which have a rotation synchronized with the advance speed of the floating structure assembly. Said intermediate cylinders 7 are interconnected by their longitudinal rotation axes 4 by attachment means 5, such as, for example, bars, fixed to an upper platform 12, at the same time as the longitudinal rotation axes of said front cylinder 6 and rear cylinder 8 are associated to the rotation axes of the cylinders adjacent thereto by hinge means 10, such as, for example, pivoting arms. Said hinge means 10 are pivotally joined to one of the ends of draft control means 9, which are pivotally joined at the other end to said upper platform 12.

Said longitudinal rotation axes 4 are arranged perpendicular to the direction of advance of said structure and associated with driving means (not shown). Also said rotating cylinders are separated from each other by a distance of about 5% of the diameter.

The draft control means 9 keep said front and rear rotating cylinders 6, 8 submerged in the order of 30% of their diameter during navigation and they are, for example, pistons.

On the other hand, said driving means (not shown) rotationally drive said rotating cylinders 2 and they are, for example, engines, said driving means (not shown) being associated to said longitudinal rotation axes 4 of said front, intermediate and rear rotating cylinders 6, 7, 8 by transmission means (not shown) which can be belts, straps, chains, gears or the like.

It should be noted that the surface of said rotating cylinders 2 is smooth.

Figure 2:
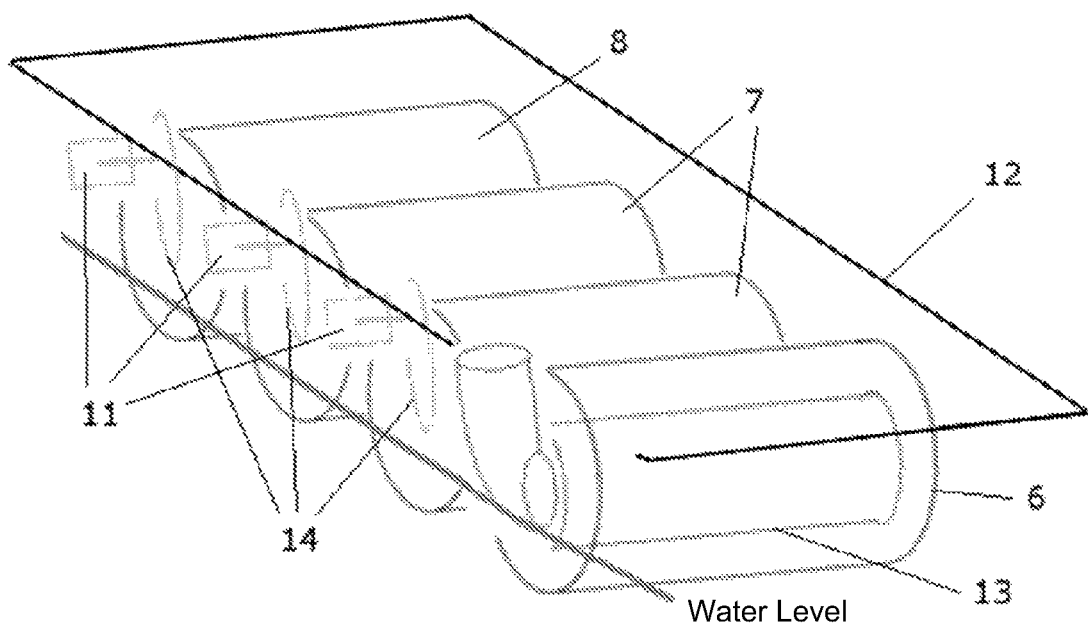
FIG. 2 illustrates a perspective view of said tandem of rotating cylinders associated to individual driving means, inside which concentric and static cylinders for transporting load are provided.

FIG. 2 illustrates said rotating cylinders 2 associated through said transmission means 14 to individual driving means 11, wherein the inside of said rotating cylinders 2 is hollow and it can carry load therein, or it can accommodate concentric and static cylinders 13 of smaller diameter to carry said load.

Finally, said rotating cylinders 2 have over-rotation capacity supplied by said driving means 11.

The invention claimed is:

1. A floating structure for transport formed by a tandem arrangement of rotating bodies of revolution that reduces resistance to advance thereof during navigation of the floating structure, comprising:
   a front body of revolution, intermediate bodies of revolution and a rear body of revolution,
   longitudinal rotation axes of said front, intermediate and rear bodies of revolution, arranged perpendicular to a direction of advance of said floating structure, wherein said rotating bodies of revolution have a rotation synchronized with a forward speed of said floating structure;
   said intermediate bodies of revolution related to each other by the longitudinal rotation axes of said intermediate bodies of revolution by bars fixed to an upper platform;
   said longitudinal rotation axes of said front and rear bodies of revolution are connected to rotation axes of the bodies of revolution adjacent thereto by a hinge, said hinge pivotally joined to a first end of a piston, which keeps said front and rear rotating bodies of revolution submerged in the order of 30% of the front and rear rotating bodies of revolution maximum diameter during navigation and are pivotally joined by a second end thereof to said upper platform;
   said rotating bodies of revolution separated from each other by a distance of approximately 5% or less of said rotating bodies of revolution maximum diameter; and
   said longitudinal rotation axes are connectable with an engine; and
   wherein at least one of said rotating bodies of revolution comprises in an interior thereof, in turn, static and concentric bodies of revolution of smaller diameter to carry load.

2. The floating structure according to claim 1, wherein said hinge comprises pivoting arms.

3. The floating structure according to claim 1, wherein surfaces of said rotating bodies of revolution are smooth and comprise hollow interiors in order to have a capacity to carry load.

4. The floating structure according to claim 1, wherein said rotating bodies of revolution are cylinders.

* * * * *